United States Patent [19]

Hatanaka et al.

[11] Patent Number: 5,665,805
[45] Date of Patent: Sep. 9, 1997

[54] ROOM TEMPERATURE CURING SILICONE ELASTOMER COMPOSITION

[75] Inventors: Hidekatsu Hatanaka; Seiji Hori, both of Chiba, Japan

[73] Assignee: Dow Corning Toray Silicone Co., Ltd., Tokyo, Japan

[21] Appl. No.: 748,463

[22] Filed: Nov. 8, 1996

[30] Foreign Application Priority Data

Nov. 29, 1995 [JP] Japan .................. 7-334003

[51] Int. Cl.⁶ .................................................. C08K 5/09
[52] U.S. Cl. .................. 524/322; 524/284; 524/300; 528/12; 528/17; 528/18; 528/21; 525/477
[58] Field of Search ..................... 524/322, 300, 524/284; 528/12, 17, 18, 21; 525/477

[56] References Cited

U.S. PATENT DOCUMENTS

| | | | |
|---|---|---|---|
| 4,111,890 | 9/1978 | Getson et al. | 260/37 |
| 4,221,693 | 9/1980 | Getson et al. | 260/37 |
| 4,683,251 | 7/1987 | Mikami | 524/770 |
| 4,687,829 | 8/1987 | Chaffee et al. | 528/17 |
| 4,782,112 | 11/1988 | Kondo et al. | 524/861 |
| 4,906,695 | 3/1990 | Blizzard et al. | 525/100 |
| 5,180,771 | 1/1993 | Arai et al. | 524/588 |
| 5,183,873 | 2/1993 | Viksne | 528/16 |
| 5,514,765 | 5/1996 | Hori et al. | 528/18 |

FOREIGN PATENT DOCUMENTS

| | | |
|---|---|---|
| 0 566 936 A1 | 4/1993 | European Pat. Off. . |
| 083167 | 4/1988 | Japan . |

OTHER PUBLICATIONS

European Search Report dated Feb. 27, 1997.

*Primary Examiner*—Melvyn I. Marquis
*Attorney, Agent, or Firm*—Roger H. Borrousch

[57] ABSTRACT

A room temperature curing silicone elastomer composition with superior workability before curing which forms a silicone elastomer of a low modulus and high elongation after curing. A room temperature curing silicone elastomer composition prepared from a diorganopolysiloxane having both terminals of the molecular chains blocked by silanol groups, a diorganopolysiloxane having one terminal of the molecular chain blocked by a silanol group and the other terminal blocked by a trialkylsiloxy group, (B) an organosilane, (C) an organopolysiloxane resin, (D) a curing catalyst and (E) a higher fatty acid.

8 Claims, No Drawings

ROOM TEMPERATURE CURING SILICONE ELASTOMER COMPOSITION

BACKGROUND OF THE INVENTION

1. Technological Field of the Invention

This invention relates to a room temperature curing silicone elastomer composition, and, in detail, it relates to a composition that becomes a silicone elastomer of low modulus and high elongation after curing at room temperature.

2. Background Information

Compositions that cure at room temperature to form silicone elastomers (room temperature curing silicone elastomer compositions) are known conventionally and are widely used in the industrial world. Known mechanisms of curing this type of composition at room temperature include a mechanism whereby curing is effected by a hydrosilylation reaction, a mechanism whereby curing is effected by ultraviolet rays and a mechanism whereby curing is effected by a condensation reaction of silanol groups and silicon bonded functional groups. Of these, silicone elastomer compositions that are cured by mechanisms by condensation reactions exhibit the characteristics that they can readily exhibit adhesiveness at room temperature, that curing is not readily inhibited by impurities that cure at room temperature, that curing can occur in a short time simply by mixing the principal component and a curing agent, that they can be stored stably for long periods and that they can be cured by allowing them to stand in the atmosphere. They have been widely used for adhesives, coatings, and sealants. However, there is the limitation that workability before curing in respect to mixing, pouring and finishing by manual operation must be maintained, for which reason there has been the problem that mechanical properties are limited. Specifically, it is necessary for the molecular weight of the diorganopolysiloxane, which is the principal component, to be controlled below a certain level in order to facilitate workability. Because of this restriction, it is difficult to keep hardness and modulus of the silicone elastomer after curing below a certain level. For this reason, methods have been proposed in which a polyfunctional cross-linking agent and a bifunctional chain extending agent are used in combination and in which crosslinking and curing are completed as the diorganopolysiloxane chain is being extended (chain extension) during the curing reaction.

Specifically, two methods have been proposed, a method in which a siloxane having two N,N-dialkylaminoxy groups in 1 molecule and a siloxane having three N,N-dialkylaminoxy groups in 1 molecule are used in combination and a method in which a silane having two N-alkylacetamide groups in 1 molecule and a silane having three N-alkylacetamide groups in 1 molecule are used in combination. However, there have been problems with these methods. In the first proposal, i.e., in the method in which N,N-dialkylaminoxy groups are used, N,N-dialkylhydroxylamine is produced as a by-product during the curing reaction. The unpleasant odor of this hydroxylamine has been a problem. Further, hydroxylamine has strong basicity. When atmospheric temperature is slightly increased, siloxane bonds of the diorganopolysiloxane are cleaved, for which reason there has been the major problem that curing is impeded. Siloxanes having N,N-dialkylaminoxy groups are expensive and this is disadvantageous economically. In the method in which N-alkylacetamide groups are used, which is the second proposal, the unpleasant odor of the N-alkylacetamide has been a problem during curing. Moreover, when compounds having active hydrogens such as alcohol are present in the atmosphere, the N-alkylacetamide groups undergo a substitution reaction with the alkoxy groups. As a result, there has been the problem that curing is impeded. In addition, silanes having N-alkylacetamide groups are expensive and are therefore disadvantageous economically. It has also been proposed that chain extension and crosslinking be performed using functional groups that have been widely used conventionally and that do not cause secondary reactions without the use of special, expensive functional groups as seen in the foregoing two proposals. For example, in Japanese Patent Application Kokai No. Sho 63-83167 (1988), a method has been proposed in which $HRNCH_2Si(Me)(OMe)_2$ (where Me is methyl) is used as the chain extending agent. However, there are the problems that this chain extending agent is difficult to manufacture economically and that it is difficult to achieve a stable balance with the crosslinking agent.

A method using $Ph\{(Me)_3SiO\}Si(OMe)_2$ (where Ph is phenyl) is proposed in U.S. Pat. No. 4,687,829, issued Aug. 18, 1987, to Chaffee et al. However, initial properties like those when N,N- dialkylaminoxy groups are used cannot be obtained. It is further desirable that the durability properties of silicone construction sealants for use as weather seals meet the standards of construction sealants durability tests 10030 and 9030 as stipulated in JIS A 5758. However, at present, the only construction sealants on the market that satisfy these tests are sealants using silanes that have N,N-dialkylaminoxy groups and sealants that have N-alkylacetamide groups as described above. Sealing materials in which silanes having other functional groups are used do not satisfy these standards.

SUMMARY OF THE INVENTION

Problems the Invention is Intended to Solve

The inventors conducted intensive research for the purpose of solving the aforementioned problems. As a result, they succeeded in solving the aforementioned problems by the present invention.

An objective of this invention is to provide a room temperature curing silicone elastomer composition that is of superior workability before curing and that forms a silicone elastomer of low modulus and high elongation after curing, and, in particular, to provide a room temperature curing silicone elastomer composition that satisfies durability test 10030 or 9030 as stipulated in JIS A 5758.

Means for Solving the Problem

Specifically, the objectives of this invention are achieved by means of a room temperature curing silicone elastomer composition that is comprising (A) 100 parts by weight of diorganopolysiloxane comprising (a) a diorganopolysiloxane having a viscosity at 25° C. of 0.1 to 1,000 Pa.s and having both molecular chains terminals blocked by silanol groups and (b) a diorganopolysiloxane having a viscosity at 25° C. of 0.1 to 1,000 Pa.s and having one terminal of the molecular chain blocked by a silanol group and the other terminal blocked by a trialkylsiloxy group, the molar ratio of diorganopolysiloxane of (a) to diorganopolysiloxane of (b) being in the range of 1.0:0.3 to 1.0:3.0; (B) 0.1 to 20 parts by weight of organosilane represented by the general formula $R^1_{4-a}Si(OR^2)_a$ wherein $R^1$ and $R^2$ are monovalent hydrocarbon groups having 1 to 20 carbon atoms and a is 3 or 4 or a partial hydrolyzate thereof; (C) 5 to 30 parts by weight of solid organopolysiloxane resin of $R^3_3SiO_{1/2}$ units wherein $R^3$ is a monovalent hydrocarbon group having 1 to 20 carbon atoms or a hydroxyl group) and $SiO_{4/2}$ units, where the molar ratio of $R^3_3SiO_{1/2}$ units to $SiO_{4/2}$ units is in the range of 0.5:1.0 to 1.2:1.0; (D) 0.01 to 20 parts by weight of a curing catalyst, and (E) 0.5 to 2 parts by weight of higher fatty acid.

DETAILED DESCRIPTION OF THE PREFERRED EMBODIMENTS

The diorganopolysiloxane of component (A) is is the principal component of the composition of this invention and is one of the components that is essential for achieving the characteristics of the composition of this invention.

The diorganopolysiloxane, component (A), is a combination of (a) diorganopolysiloxane and (b) diorganopolysiloxane. (a) is a diorganopolysiloxane that has a viscosity at 25° C. of 0.1 to 1,000 Pa.s in which both terminals of the molecular chain are blocked by silanol groups. Examples of these diorganopolysiloxanes include dimethylpolysiloxanes both terminals of which are blocked by silanol groups, dimethylsiloxane-methylvinylsiloxane copolymers both terminals of which are blocked by silanol groups, dimethylsiloxane-methylphenylsiloxane copolymers both terminals of which are blocked by silanol groups and methyl(3,3,3-trifluoropropyl)polysiloxanes both terminals of which are blocked by silanol groups. Of these, dimethylpolysiloxanes having both terminals blocked by silanol groups are preferable.

The diorganopolysiloxane (b) is a diorganopolysiloxane that has a viscosity at 25° C. of 0.1 to 1,000 Pa.s and has one terminal of the molecular chain blocked by a silanol group and the other terminal blocked by a trialkylsiloxy group. Examples of these diorganopolysiloxanes include dimethylpolysiloxanes having one terminal of the molecular chain blocked by a silanol group and the other terminal blocked by a trimethylsiloxy group, dimethylsiloxane-methylvinylsiloxane copolymers having one terminal of the molecular chain blocked by a silanol group and the other terminal blocked by a trimethylsiloxy group, dimethylsiloxane-methylphenylsiloxane copolymers having one terminal of the molecular chain blocked by a silanol group and the other terminal blocked by a trimethylsiloxy group and methyl(3,3,3-trifluoropropyl)polysiloxane having one terminal blocked by silanol group and the other terminal blocked by trimethylsiloxy group.

The diorganopolysiloxane of component (A) is a combination of diorganopolysiloxane (a) and diorganopolysiloxane (b) as described above. When the ratio of component (b) is excessively low, the modulus of the silicone elastomer becomes excessively high after curing and a silicone elastomer having a low modulus and high elongation cannot be obtained. Conversely, when the ratio of component (b) is excessively high, the mechanical strength of the silicone elastomer after curing is decreased. Therefore, it is necessary that the molar ratio of component (a) and component (b) be in the range of 1.0:0.3 to 1.0:3.0, with a ratio within the range 1.0:0.5 to 1.0:3.0 being desirable.

The diorganopolysiloxane of component (A) is contains component (a) and component (b) as described above. In addition to component (a) and component (b), a small quantity of diorganopolysiloxane not having silanol groups in the terminals of the molecular chain may be present to an extent that the objective of the invention is not impaired. Examples of these diorganopolysiloxanes include dimethylpolysiloxanes having terminals of the molecular chain blocked by trimethylsiloxy groups, dimethylsiloxane-methylvinylsiloxane copolymers having terminals of the molecular chain blocked by trimethylsiloxy groups and dimethylsiloxane-methylphenylsiloxane copolymers having terminals of the molecular chain blocked by trimethylsiloxy groups. Further, when the viscosity of the diorganopolysiloxane of component (A) is excessively low, the cured silicone elastomer lacks elasticity. When its viscosity is excessively high, extruding capacity is depressed and discharge from containers such as cartridges becomes difficult. For this reason, it is necessary that its viscosity at 25° C. be in the range of 100 to 1,000,000 centipoise, with a range of 100 to 100,000 centipoise being desirable.

Component (B) is used as the crosslinking agent for component (A). This crosslinking agent is an organosilane that is represented by the general formula $R^1_{4-n}Si(OR^2)_a$ wherein $R^1$ and $R^2$ are monovalent hydrocarbon groups having 1 to 20 carbon atoms as exemplified by alkyl groups such as methyl, ethyl, and propyl; alkenyl groups such as vinyl, allyl, and hexenyl; and aryl groups such as phenyl and a is 3 or 4 or partial hydrolyzates thereof. Specific examples of component (B) include tetramethoxysilane, tetraethoxysilane, tetraisopropoxysilane, methyltrimethoxysilane, vinyltrimethoxysilane, decyltrimethoxysilane, methyltriethoxysilane, phenyltrimethoxysilane and methyltri(ethoxymethoxy)silane. One type of these compounds is generally selected as component (B). However, as required, two or more of them can be compounded. Partial hydrolyzates of these compounds can also be used. The quantity of component (B) that is added is determined taking into consideration the quantity of silanol in component (A), in consideration of the physical properties required after curing, the raw materials that are added in addition to components (A) through (D), and the impurities such as water that are contained in them. However, it is necessary that the amount be 0.01 to 20 parts by weight per 100 parts by weight of component (A). When it exceeds 20 parts by weight, there is the bad effect that complete curing does not occur.

The solid organopolysiloxane resin component (C) is one of the components that is characteristic of this invention and is used for the purpose of regulation of the modulus and of obtaining a cured product of a high recovery rate. When a diorganopolysiloxane not having silanol groups is used as a modulus regulator, there are the bad effects of decrease in adhesiveness and of bleeding after curing. The modulus can be regulated as desired by adding an organopolysiloxane resin with which these bad effects do not readily occur. In addition, it improves recovery rate and is advantageous in durability tests. Component (C) is an organopolysiloxane resin that has M units represented by the general unit formula $R^3_3SiO_{1/2}$ where $R^3$ is a monovalent hydrocarbon group having 1 to 20 carbon atoms like $R^1$ and $R^2$ described above and Q units represented by the unit formula $SiO_{4/2}$. The molar ratio of M units and Q units is in the ratio of 0.5:1.0 to 1.2:1.0. When the quantity of M units is excessive, there is a modulus regulating effect but there is the bad effect that compression permanent set becomes poor. The hydroxyl groups of component (C) should be present in a quantity less than 1 wt % of the weight of component (C). When the quantity of hydroxyl group in (C) is excessive, there is the bad effect that component (B) is consumed wastefully. The quantity of component (C) added is in the range of 5 to 30 parts by weight per 100 parts by weight of (A).

Component (D) is a catalyst for the purpose of promoting the condensation reaction between component (A), component (B) and component (C) and of accelerating curing. Conventionally known catalysts for promoting the curing of components (A), (B), and (C) can be used to the extent that they do not impair the function of the composition of this invention. Examples of component (D) include tin catalysts such as dialkyltin dicarboxylates, dialkyltin bis (acetylacetonate) such as dibutyltin bis(acetylacetonate), and tin octoate, iron octoate, zirconium octoate, titanic acid esters such as tetrabutyl titanate, and tetra (i-propyl) titanate, and amine catalysts such as tetramethyl guanidine. However, they are not limited to these substances. Although a single compound is generally used for component (D), two or more can be compounded. When two or more are compounded, it is desirable to use a mixture of the tin catalysts dibutyl tin bis(acetylacetonate) and tin octylate. It is necessary that the quantity of component (D) that is added, be 0.01 to 20 parts per weight per 100 parts by weight of component (A). When it is less than 0.01 parts by weight, curing is not sufficiently promoted. When it exceeds 20 parts by weight, the bad effects of loss of water resistance and heat resistance occur frequently.

The higher fatty acid of component (E) is one of the components that characterizes this invention and is used for the purpose of improving curing characteristics. Examples of component (E) include oleic acid, stearic acid, palmitic acid and arachic acid. The quantity of component (E) that is added is 0.5 to 2 parts by weight per 100 parts by weight of (A). When it is less than 0.5 parts by weight, its effect is not manifested. When it exceeds 2 parts by weight, the bad effects of decrease of weather resistance and adhesiveness occur frequently.

The composition of this invention is comprised of component (A) through component (E) as described above. In addition to these components, as required, diorganopolysiloxanes not containing silanol groups, inorganic fillers such as fumed silica, precipitated silica, fine quartz powder, carbon black and calcium carbonate and treatment agents for making them hydrophobic, silicone resins in addition to component (C), fluidity regulators, silane and siloxane tackifiers, pigments, heat resisting materials, flame-retardants, organic solvents, mold inhibitors and antibacterial agents may also be added.

The room temperature curing silicone elastomer composition of this invention can be manufactured easily by mixing the aforementioned components (A) through (E) uniformly. The order of mixing components (A) through (E) may be to add them in the order component (A), component (B), component (C), component (D) and component (E) or to mix components (B) through (E) in advance and then added this mixture to component (A).

The compositions of this invention as described above form silicone elastomers having a low modulus and high elongation after curing. During curing, impairment of curing does not readily occur and adhesiveness can easily be conferred on them. For this reason, they are particularly useful for adhesives, coatings and sealants. In particular, because they meet the standards of durability tests 10030 or 9030 for construction sealants as stipulated in JIS A 5758, they can be used satisfactorily as construction sealants.

We shall now describe this invention by means of examples. In the examples, parts indicates parts by weight. The physical properties and characteristics of the room temperature curing silicone elastomer compositions were determined in accordance with the determination methods stipulated for construction sealants in JIS A 5758.

EXAMPLE 1

100 parts of dimethylpolysiloxane which was a mixture in a molar ratio of 1:1 of dimethylpolysiloxane having both terminals of the molecular chain blocked by silanol groups and of dimethylpolysiloxane having one terminal of the molecular chain blocked by a silanol group and the other terminal blocked by a trimethylsiloxy group, 13 parts of methylpolysiloxane resin comprised of $(CH_3)_3SiO_{1/2}$ units and $SiO_{4/2}$ units in a molar ratio of 0.7:1 in which the hydroxyl group content was less than 1 wt %, 3.0 parts of decyltrimethoxysilane, 0.06 parts of dibutyl tin dilaurate, 1.2 parts of oleic acid and 100 parts of fine calcium carbonate powder treated with fatty acid (brand name of CALBATEC Viscolite-U, manufactured by Shiraishi Kogyo Co., Ltd., Amagasaki-shi, Hyogo Prefecture, Japan) were mixed uniformly and a room temperature curing silicone elastomer composition was prepared. Next, a type H joint as stipulated in JIS A5758 was made from this composition and determinations were made of its 50% modulus, elongation, maximum point stress, and durability tests 9030 and 10030 after curing for 7 days at 20° C. and then 7 days at 50° C. The results of these determinations were as shown below.

| | |
|---|---|
| 50% modulus, kPa | 118 |
| Maximum point stress, kPa | 902 |
| Elongation, % | 730 |
| Durability test 9030 | passed |
| Durability test 10030 | passed |

EXAMPLE 2

100 parts of dimethylpolysiloxane which was a mixture in a molar ratio of 1:1.5 of dimethylpolysiloxane having both terminals of the molecular chain blocked by silanol groups and of dimethylpolysiloxane having one terminal of the molecular chain blocked by a silanol group and the other terminal blocked by a trimethylsiloxy group, 13 parts of methylpolysiloxane resin of $(CH_3)_3SiO_{1/2}$ units and $SiO_{4/2}$ units in a molar ratio of 0.7:1 in which the hydroxyl group content was less than 1 wt %, 3.0 parts of decyltrimethoxysilane, 0.06 parts of dibutyl tin dilaurate, 1.2 parts of oleic acid and 100 parts of fine calcium carbonate powder treated with fatty acid as identifed in Example 1 were mixed uniformly and a room temperature curing silicone elastomer composition was prepared. Next, the physical properties of this composition were determined in the same way as in Example 1. The results of these determinations were as shown below.

| | |
|---|---|
| 50% modulus, kPa | 137 |
| Maximum point stress, kPa | 1000 |
| Elongation, % | 650 |
| Durability test 9030 | passed |

COMPARATIVE EXAMPLE 1

100 parts of dimethylpolysiloxane having both terminals of the molecular chain blocked by silanol groups, 13 parts of methylpolysiloxane resin comprised of $(CH_3)_3SiO_{1/2}$ units and $SiO_{4/2}$ units in a molar ratio of 0.7:1 in which the hydroxyl group content was less than 1 wt %, 3.0 parts of decyltrimethoxysilane, 0.06 parts of dibutyl tin dilaurate, 1.2 parts of oleic acid and 100 parts of fine calcium carbonate powder treated with fatty acid as identified in Example 1 were mixed uniformly and a room temperature curing silicone elastomer composition was prepared. Next, the physical properties of this composition were determined in the same way as in Example 1. The results of these determinations were as shown below.

| | |
|---|---|
| 50% modulus, kPa | 255 |
| Maximum point stress, kPa | 608 |
| Elongation, % | 400 |
| Durability test 9030 | did not pass |

COMPARATIVE EXAMPLE 2

100 parts of dimethylpolysiloxane which was a mixture in a molar ratio of 1:1.5 of dimethylpolysiloxane having both terminals of the molecular chain blocked by silanol groups and of dimethylpolysiloxane having one terminal of the molecular chain blocked by a silanol group and the other terminal blocked by a trimethylsiloxy group, 13 parts of methylpolysiloxane resin of $(CH_3)_3SiO_{1/2}$ units and $SiO_{4/2}$ units in a molar ratio of 0.7:1 in which the hydroxyl group content was less than 1 wt %, 3.0 parts of decyltrimethoxysilane, 0.06 parts of dibutyl tin dilaurate and 100 parts of free calcium carbonate powder treated with fatty acid as identifed in Example 1 were mixed uniformly and a room temperature curing silicone elastomer composition was prepared. Next, the physical properties of this composition were determined in the same way as in Example 1. The results of these determinations were as shown below.

| | |
|---|---|
| 50% modulus, kPa | 98 |
| Maximum point stress, kPa | 647 |
| Elongation, % | 650 |
| Durability test 9030 | did not pass |

Effect of the Invention

The room temperature curing silicone elastomer composition of this invention is comprised of components (A) through (E), and, in particular, it contains the specific diorganopolysiloxane of component (A), the organopolysiloxane resin of component (C) and the higher fatty acid of component (E). For these reasons, it has the characteristics that it is a silicone elastomer that exhibits excellent workability before curing and that is of a low modulus, a high degree of elongation and excellent durability after curing.

That which is claimed is:

1. A room temperature curing silicone elastomer composition that is comprising (A) 100 parts by weight of diorganopolysiloxane comprising (a) a diorganopolysiloxane having a viscosity at 25° C. of 0.1 to 1,000 Pa.s and having both molecular chains terminals blocked by silanol groups and (b) a diorganopolysiloxane having a viscosity at 25° C. of 0.1 to 1,000 Pa.s and having one terminal of the molecular chain blocked by a silanol group and the other terminal blocked by a trialkylsiloxy group, the molar ratio of diorganopolysiloxane of (a) to diorganopolysiloxane of (b) being in the range of 1.0:0.3 to 1.0:3.0;

(B) 0.1 to 20 parts by weight of organosilane represented by the general formula $R^1_{4-a}Si(OR^2)_a$ wherein $R^1$ and $R^2$ are monovalent hydrocarbon groups having 1 to 20 carbon atoms and a is 3 or 4 or a partial hydrolyzate thereof;

(C) 5 to 30 parts by weight of solid organopolysiloxane resin of $R^3_3SiO_{1/2}$ units wherein $R^3$ is a monovalent hydrocarbon group having 1 to 20 carbon atoms or a hydroxyl group) and $SiO_{4/2}$ units, where the molar ratio of $R^3_3SiO_{1/2}$ units to $SiO_{4/2}$ units is in the range of 0.5:1.0 to 1.2:1.0;

(D) 0.01 to 20 parts by weight of a curing catalyst, and (E) 0.5 to 2 parts by weight of higher fatty acid.

2. The room temperature curing silicone elastomer composition as described in claim 1 in which the molar ratio of diorganopolysiloxane having silanol groups at both terminals of the molecular chain and of the diorganopolysiloxane having a silanol group at one terminal of the molecule chain is 1.0:0.5 to 1.0:3.0.

3. The room temperature curing silicone elastomer composition as described in claim 1 in which $R^1$ of component (B) is an alkyl group having 8 to 20 carbon atoms, $R^2$ is an alkyl group having 1 or 2 carbon atoms and a is 3.

4. The room temperature curing silicone elastomer composition as described in claim 1 in which $R^3$ is methyl.

5. The room temperature curing silicone elastomer composition as described in claim 1 in which component (C) has a hydroxyl content of less than 1 wt %.

6. The room temperature curing silicone elastomer composition as described in claim 1 in which the curing catalyst of component (D) is an organic tin compound.

7. The room temperature curing silicone elastomer composition as described in claim 1 in which the higher fatty acid of component (E) is oleic acid.

8. A room temperature curing silicone elastomer composition as described in claim 1 which is a silicone sealant for use in construction.

* * * * *